_United States Patent Office_ 3,694,277
Patented Sept. 26, 1972

3,694,277
POLYURETHANE PROPELLANT COMPOSITION CONTAINING ISODECYL ORTHOFORMATE
David C. Sayles, Huntsville, Ala., assignor to the United States of America as represented by the Secretary of the Army
No Drawing. Filed Feb. 23, 1967, Ser. No. 619,117
Int. Cl. C06d 5/06
U.S. Cl. 149—19                 5 Claims

ABSTRACT OF THE DISCLOSURE

Isodecyl orthoformate used as an ingredient for removing trace quantities of moisture from propellant compositions.

BACKGROUND OF THE INVENTION

This invention relates to an ingredient used in propellant compositions employed in rockets and particularly to one used for removing trace quantities of moisture from such propellant compositions.

The presence of water in propellant compositions tends to break down the propellant and lead to the formation of gases. The propellant may become unusable. Additionally, even if the propellant is still usable, frequent inspection of the propellant is necessary to justify its use.

Thus, the presence of trace quantities of water in propellant compositions, even if not rendering them unusable, creates the necessity for frequent inspection and cuts down on the storability of such propellant compositions.

Recognizing this, the prior art has used desiccants in propellant compositions.

An example of such a prior art desiccant is the conventional desiccant, silica gel enclosed in a closure disk inserted in the rocket nozzle.

The use of such closure disks has not proven entirely satisfactory. They require frequent inspection, do not sufficiently reduce the need for inspection, and are not completely effective.

Therefore, it is an object of this invention to provide an improved desiccant for use in propellant compositions.

Another object of this invention is to provide a lightweight desiccant for use in propellant compositions.

A further object of this invention is to provide a desiccant for use in propellant compositions which will not result in reduced propellant performance.

SUMMARY OF THE INVENTION

In accordance with this invention, it has been discovered that isodecyl orthoformate may be used as a means for removing trace quantities of moisture from propellant compositions.

DESCRIPTION OF THE PREFERRED EMBODIMENT

By the removal of moisture from the propellant composition, the deterioration of the propellants during aging as a result of hydrolytic action is prevented. The following reaction illustrates the underlying reaction:

$HC(OCH_2CHMe \cdot (CH_2)_3 \cdot CHMe \cdot CH_2CH_3)_3 + 2H_2O \rightarrow$
$HCO_2CH_2 \cdot CHMe \cdot (CH_2)_3 \cdot CHMe \cdot CH_2 \cdot CH_3$
$+ 2HOCH_2 \cdot CHMe \cdot (CH_2)_3 \cdot CHMe \cdot CH_2 \cdot CH_3$ The isodecyl formate is considerably more stable to hydrolytic attack than the isodecyl orthoformate. Thus, one mole of the orthoformate is able to tie up two molecules of water.

Note that the products formed from the reaction with moisture function as an auxiliary added plasticizer and thus compensate for any postcuring (hardening) that the propellant may undergo. Thus, there is a further feature for reducing the degradation of propellant performance on storage.

The isodecyl orthoformate may be incorporated into the propellant composition in amounts of 1–2% by weight during the compounding. It can be used as a partial or complete replacement for the plasticizer in the propellant composition. The propellant composition contains isodecyl orthoformate as the plasticizer or a combination of isodecyl orthoformate and a conventional plasticizer as the plasticizer, a fuel (such as metal), an oxidizer and a binder.

In particular, isodecyl orthoformate can be used to reduce or eliminate the moisture sensitivity of propellants such as polyurethane formulations during compounding.

Isodecyl orthoformate can be used alone or in combination with prior art desiccants (such as one of the type enclosed in a closure disk inserted in the rocket nozzle). Such a combination makes for maximum storability.

While this invention has been described with reference to a preferred embodiment thereof, it will be apparent that various modifications and other embodiments thereof will occur to those skilled in the art within the spirit and scope of this invention.

I claim:
1. A polyurethane propellant composition having as an ingredient thereof isodecyl orthoformate, said isodecyl orthoformate functioning as a plasticizer and as a desiccant.
2. The propellant composition of claim 1 wherein said isodecyl orthoformate comprises approximately 1% to 2% by weight of said propellant composition.
3. The propellant composition of claim 1 wherein said propellant composition comprises a fuel, an oxidizer, a binder, a plasticizer, and isodecyl orthoformate.
4. The propellant composition of claim 3 wherein said isodecyl orthoformate and said plasticizer are the same ingredient.
5. The propellant composition of claim 1 wherein said propellant composition comprises a fuel, an oxidizer, a binder, a plasticizer, and isodecyl orthoformate, and wherein said isodecyl orthoformate comprises approximately 1% to 2% by weight of said propellant composition.

References Cited
UNITED STATES PATENTS
3,245,849   4/1966   Klager et al. _____ 149—19

BENJAMIN R. PADGETT, Primary Examiner

U.S. Cl. X.R.
149—20